No. 891,458. PATENTED JUNE 23, 1908.
McDUFFEE BRADFORD.
WIND WHEEL.
APPLICATION FILED JULY 19, 1907.
2 SHEETS—SHEET 1.
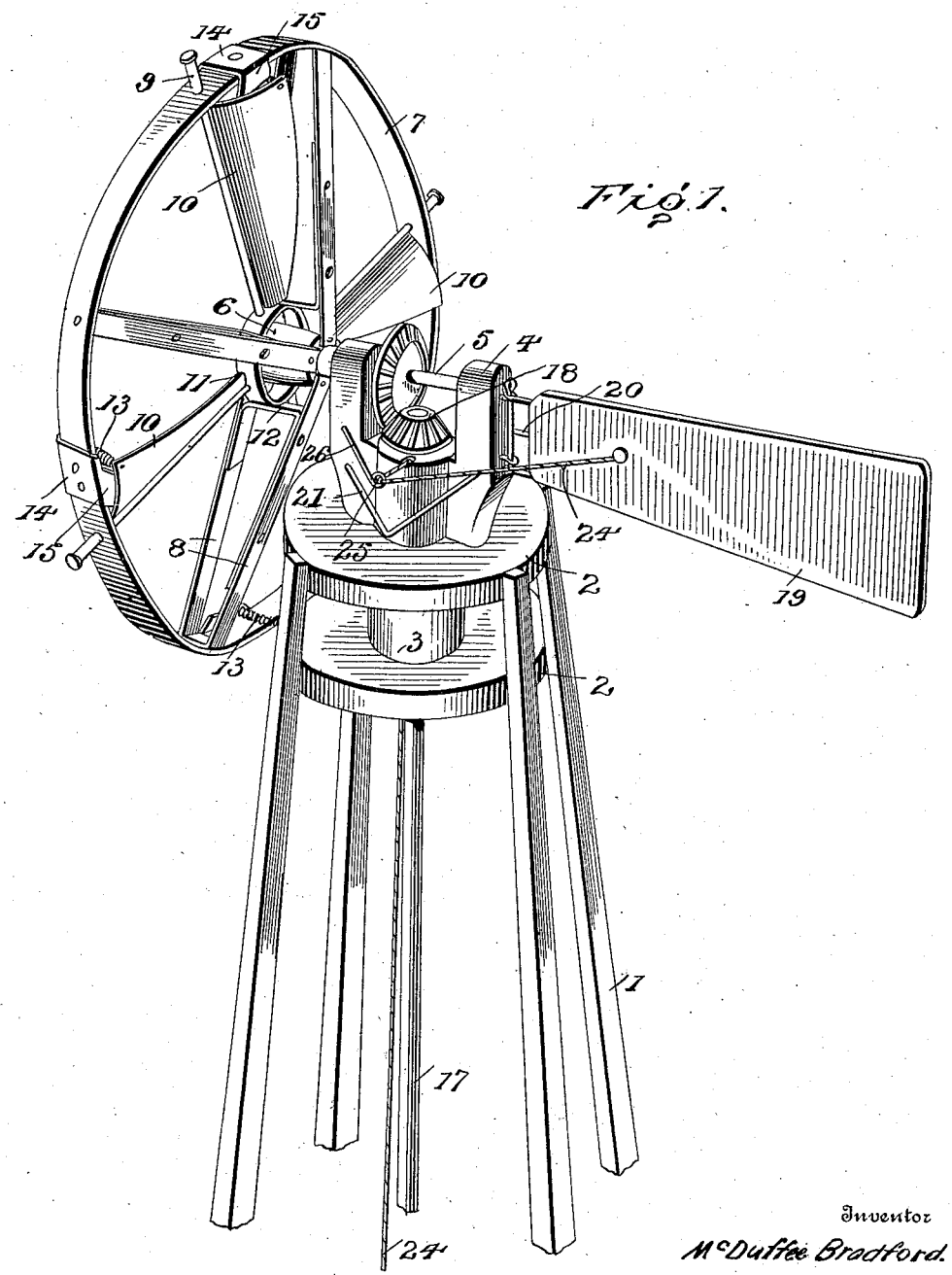

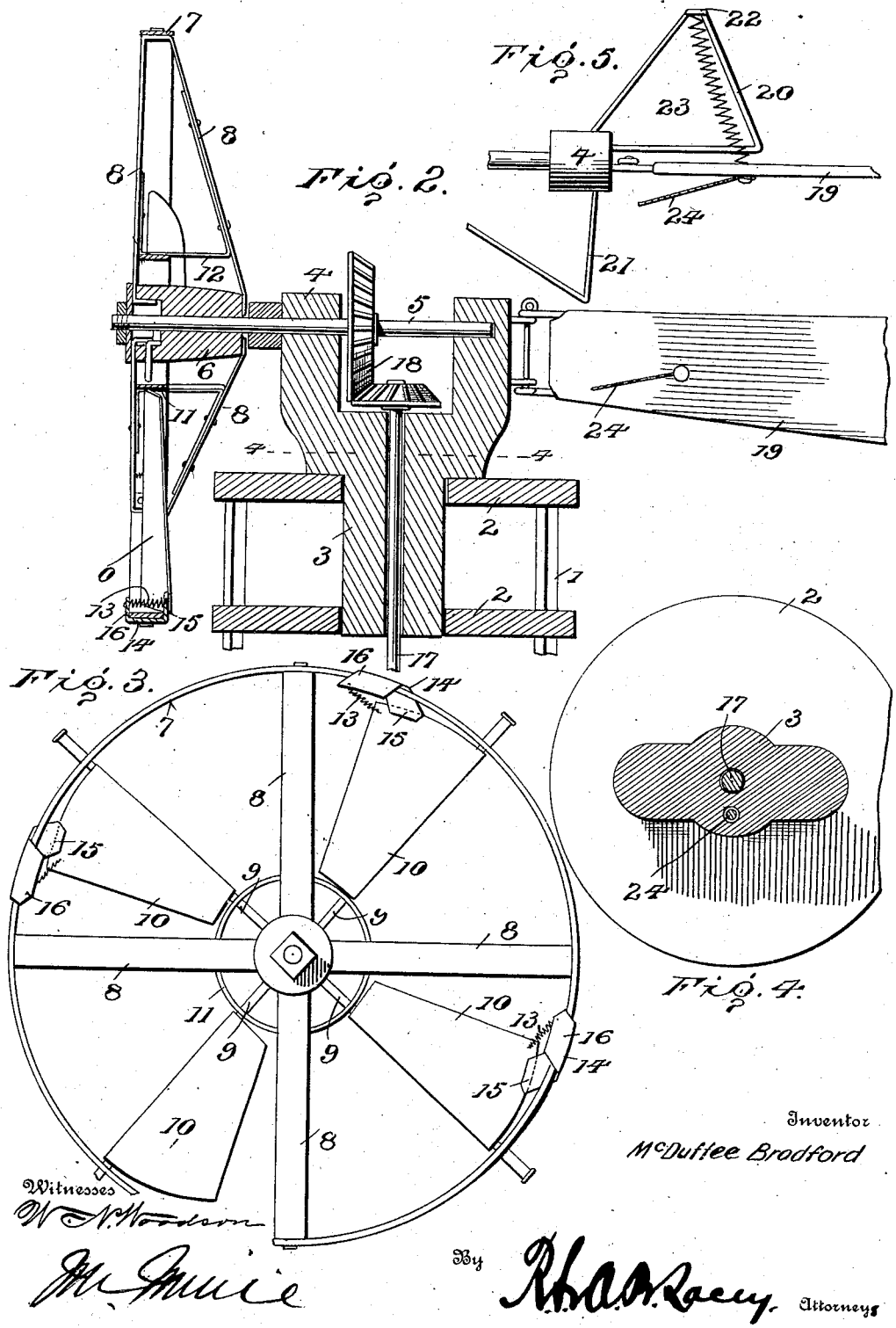

UNITED STATES PATENT OFFICE.

McDUFFEE BRADFORD, OF NOCONA, TEXAS.

WIND-WHEEL.

No. 891,458.  Specification of Letters Patent.  Patented June 23, 1908.

Application filed July 19, 1907. Serial No. 384,600.

*To all whom it may concern:*

Be it known that I, McDUFFEE BRADFORD, citizen of the United States, residing at Nocona, in the county of Montague and State of Texas, have invented certain new and useful Improvements in Wind-Wheels, of which the following is a specification.

The present invention relates to certain new and useful improvements in the construction of wind wheels and aims to provide a novel wheel which is so designed as to rotate at a uniform speed irrespective of the force or velocity of the wind.

The invention further contemplates novel means for mounting the tail upon the wheel carrying frame and controlling the movements of the tail for throwing the wheel into and out of operation.

To this end the invention resides principally in a wind wheel comprising a frame having the blades loosely mounted thereon and held in an operative position by yielding means whereby the inclination of the blades is automatically regulated according to the velocity of the wind.

For a full description of the invention and the merits thereof and also to acquire a knowledge of the details of construction and the means for effecting the result, reference is to be had to the following description and accompanying drawings, in which:

Figure 1 is a perspective view of a wind wheel embodying the invention. Fig. 2 is a vertical sectional view through the same. Fig. 3 is a plan view of the wheel detached. Fig. 4 is a horizontal sectional view on the line 4—4 of Fig. 2. Fig. 5 is a plan view showing the brackets limiting the swinging movement of the tail.

Corresponding and like parts are referred to in the following description and indicated in all the views of the drawings by the same reference characters.

Referring to the drawings the numeral 1 designates a standard which may be of any approved construction and carries the spaced bearing plates 2. Loosely mounted upon the bearing plates 2 is the wheel carrying frame which is in the nature of a cylinder 3 passing loosely through the bearing plates and provided at its upper end with the forked portion 4. The wheel shaft 5 is journaled within the two arms of the fork 4, one end of the shaft projecting beyond the fork and having the wheel rigidly connected thereto. The frame of the wheel comprises essentially a hub 6 and an outer rim 7 connected by the spoke members 8 which are arranged in pairs, each pair being shown as formed by doubling a strip of sheet material upon itself. Radial rods 9 extend from the hub 6 to the rim 7 and have the blades 10 pivotally mounted thereon. It will be observed that a ring 11 loosely engages the inner ends of the blades 10, the said ring being slightly spaced from the hub 6 and being supported in position by cross bars 12 connecting the various pairs of spokes 8. The blades 10 are normally held in an operative position by yielding means such as the springs 13 and it will be readily apparent that with this construction the inclination of the blades depends upon the velocity of the wind and the blades will automatically adjust themselves to cause the wheel to turn at a uniform velocity. Clips 14 are applied to the rim 7, each of the clips being provided with a pair of inwardly projecting arms 15 and 16 which are offset with respect to each other, the arm 15 serving as a stop for limiting the movement of the corresponding blade 10 in one direction while the arm 16 has the spring 13 connected thereto. Motion is transmitted from the wheel shaft 5 to a vertical shaft 17 journaled within the cylinder 3 by means of the beveled gearing 18.

The tail 19 is of the conventional construction and is hinged to the wheel carrying frame so as to swing between the brackets 20 and 21. Each of these brackets is in the nature of a frame and the bracket 20 is provided at its outer portion with a projection 22 having one end of a spring 23 connected thereto, the opposite end of the said spring engaging the tail and normally holding the same against the bracket 20. When in this position the tail serves to hold the wheel in an operative position. A cord 24 is utilized for moving the tail 19 against the bracket 21 where it serves to maintain the wheel in an inoperative position. This cord 24 passes through a guide member 25 carried by an arm 26 projecting from the wheel carrying frame and then extends through an opening in the cylinder 3 whereby when tension is exerted upon the lower end of the cord the tail is moved against the action of the spring 23 and held against the bracket 21. In this connection it is desired to state that any desired form of roller or antifriction bearings may be utilized in connection with the various moving parts of the device. This wheel as has been previously mentioned will always rotate at a uniform speed owing to the fact that as the wind becomes stronger the blades 10 are swung outwardly against the action of the springs 13 and do not utilize the full power thereof.

Having thus described the invention, what is claimed as new is:

1. A wind wheel comprising a frame, blades pivotally mounted upon the frame, a pair of projections upon the frame for each of the blades, the projections of each pair being positioned oppositely, one of the projections serving as a stop for the blade, and a spring connecting the blade to the opposite projection.

2. A wind wheel comprising a frame, blades pivotally mounted upon the frame, clips applied to the frame and formed with projections, one of the projections serving as a stop for the corresponding blade, and a spring connecting the blade to the opposite projection.

3. A wind wheel comprising a frame, blades pivotally mounted upon the frame, clips applied to the frame, each of the clips carrying a pair of arms offset with respect to each other, one of the arms constituting a stop for the corresponding blade, and a spring connecting the blade with the opposite arm.

4. In a wind wheel, the combination of a hub, an outer rim, connecting means between the hub and outer rim, rods connecting the rim and hub, blades pivotally mounted upon the rods, clips applied to the rim, each of the clips carrying a pair of inwardly extending projections offset with respect to each other, one of the projections constituting a stop for the corresponding blade, and a spring connecting the blade with the opposite projection.

In testimony whereof I affix my signature in presence of two witnesses.

McDUFFEE BRADFORD. [L. S.]

Witnesses:
 E. W. MINOR,
 HUGH C. YANTIS.